C. F. FEHR.
LEVER LOCK FOR END GATES.
APPLICATION FILED AUG. 26, 1919.
1,400,483.
Patented Dec. 13, 1921.
2 SHEETS—SHEET 1.
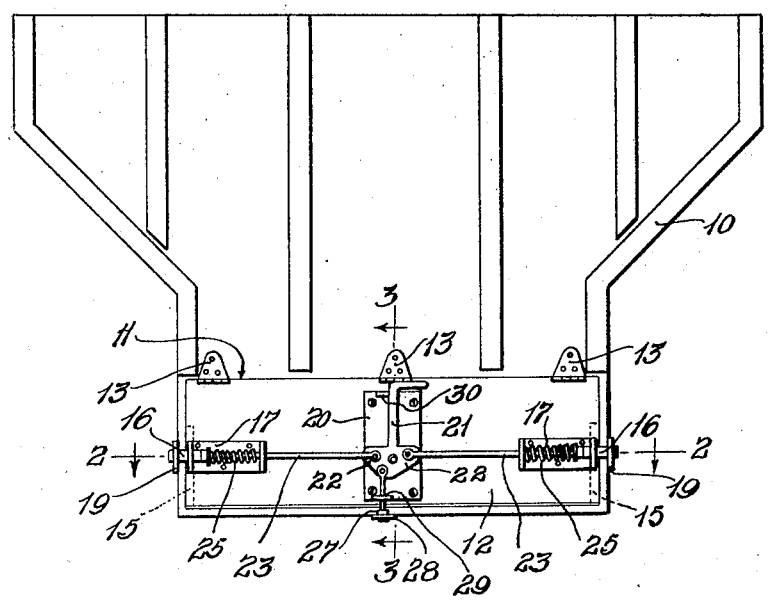
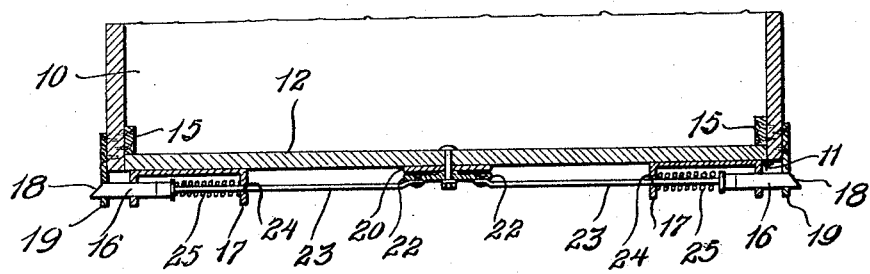
WITNESS:
INVENTOR.
BY C. F. Fehr
Victor J. Evans
ATTORNEY.

C. F. FEHR.
LEVER LOCK FOR END GATES.
APPLICATION FILED AUG. 26, 1919.
1,400,483.
Patented Dec. 13, 1921.
2 SHEETS—SHEET 2.
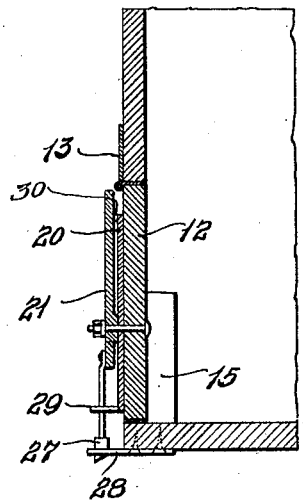
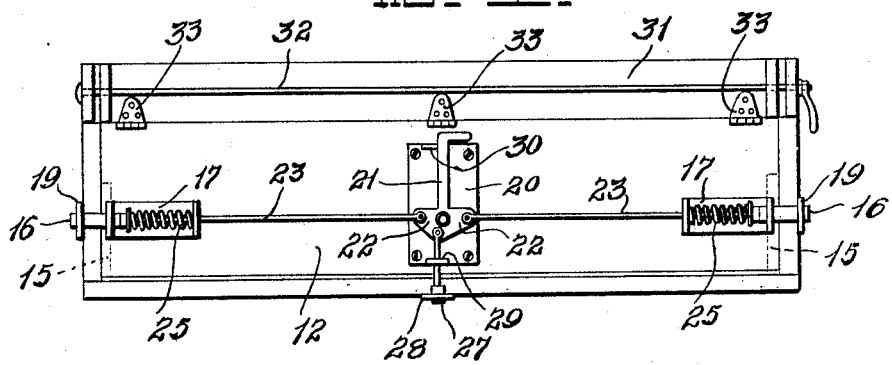
WITNESS:
INVENTOR.
BY C. F. Fehr
Victor J. Evans
ATTORNEY.

UNITED STATES PATENT OFFICE.

CARL FREDRICK FEHR, OF ARLINGTON, KANSAS.

LEVER-LOCK FOR END-GATES.

1,400,483.   Specification of Letters Patent.   Patented Dec. 13, 1921.

Application filed August 26, 1919. Serial No. 319,894.

*To all whom it may concern:*

Be it known that I, CARL F. FEHR, a citizen of the United States, residing at Arlington, in the county of Reno and State of Kansas, have invented new and useful Improvements in Lever-Locks for End-Gates, of which the following is a specification.

This invention relates to improvements in vehicle end gates, especially designed for application to grain tanks, but is also adapted for use upon other types of wagons.

An object of the present invention is to provide a locking device for use upon end gates, which, when the gates are closed, will hold them absolutely grain tight and prevent leakage or waste of grain, but which is easily operated to permit of the gate being opened and the contents of the vehicle removed.

Another object is the provision of a novel form of latch, which is included in the locking device, the said latch acting to force the gate to a tightly closed position and to so hold it until loosely released.

A further object is the novel form of operating means for the latches which will simultaneously operate all of the latches and hold them in retracted position, so that the gate may be opened.

With the above and other objects in view, the invention includes the following novel features and details of construction, to be hereinafter more fully described and illustrated in the accompanying drawings.

In the drawings:

Figure 1 is an end elevation of a grain tank with the invention applied thereto.

Fig. 2 is a sectional view on the line 2—2 of Fig. 1.

Fig. 3 is a similar view on the line 3—3 of Fig. 1.

Fig. 4 illustrates the manner of applying the invention to an ordinary wagon body or box.

Referring to the drawings in detail, and especially to Figs. 1 to 3, inclusive, the grain tank is indicated at 10. This tank may be of the usual, or any preferred construction and includes an opening 11 in the lower portion of the rear end of the tank, which is adapted to be closed by an end gate 12. The opening 11 preferably extends across the entire width of the tank, so as to easily and effectually remove all grain.

The end gate 12 is hingedly secured along its upper edge to the grain tank 10, by means of the hinges 13, the gate opening upward. To prevent leakage of the grain between the bottom of the tank and the lower edge of the gate, the latter is provided along its lower edge with a fabric edging, so as to prevent the escape of the contents of the vehicle body between the lower edge of the gate and the floor. Located along opposite sides of the interior of the vehicle body are cleats or stops 15, against which the end gate contacts to limit its inward movement.

The gate is in closed position through the medium of a novel form of locking device, which includes slidably mounted oppositely extending latches or bolts 16. These latches or bolts mounted for sliding movement in guides 17, are located at opposite ends of the end gate and normally project beyond the ends of said gate and have their projecting ends beveled, as indicated at 18. These beveled ends are engageable with sockets or keepers 19, carried by the grain tank or vehicle body and positioned adjacent the edge of the opening 11. Pivotally mounted upon a plate 20, secured to the end gate, is an operating lever 21, one end of which is provided with oppositely extending arms 22, so that the said lever is substantially T-shaped. One of the latches 16 is connected to each of the arms 22 through the medium of a rod 23, which operates through a slot 24, provided in the guide 17. Positioned upon the rod between the end of the guide and the end of the latch or bolt 16, is a spring 25, which acts to force the latch or bolt outwardly for engagement with the sockets or keepers 19. By beveling the ends of the latches or bolts in the manner described, they readily enter the keepers or sockets 19 and securely hold the gate against the cleats or stops 15.

Pivotally secured to the lever 21, as indicated at 26, is a latch or bolt 27, the latter also being beveled upon its outer end for engagement with a keeper or socket 28, carried by the grain tank or vehicle body. The latch or bolt 27 is slidable in a guide 29, carried by one end of the plate 20 and projecting from the opposite end of this plate is a stop 30, which is located in the path of movement of the lever 21 and positioned so as to hold the latches retracted.

In Fig. 4 the invention is shown as applied to a wagon box, and for this purpose there is provided a member 31, which is secured to the wagon box through the medium of a rod 32. In this form of the invention, the end gate 12 is hingedly secured to the member 31, as shown at 33. In all other respects the construction and operation is similar to the one previously described.

The invention is susceptible of various changes in its form, proportions and minor details of construction and the right is herein reserved to make such changes as properly fall within the scope of the appended claim.

Having described the invention, what is claimed is:

The combination with a hinged member, of a base plate secured thereto, a substantially triangular member pivotally mounted upon the base plate, oppositely disposed spring actuated latches pivotally connected to the opposite corners of the triangular member for engagement with stationary keepers, an additional latch pivotally secured to the other corner of the triangular member for engagement with a stationary keeper, a guide lug extending from the base plate for the passage of the additional latch, an operating lever extending from the triangular member opposite the additional latch and a stop lug extending from the base plate in the path of the operating lever to limit its movement in one direction.

In testimony whereof I affix my signature.

CARL FREDRICK FEHR.